Patented May 6, 1952

2,595,310

UNITED STATES PATENT OFFICE 2,595,310

VINYL RESINS PLASTICIZED WITH TRI-CRESYL PHOSPHATE AND STABILIZED WITH BARIUM RICINOLEATE

Malcolm Kent Smith, Elizabeth, N. J., assignor to The Baker Castor Oil Company, Jersey City, N. J., a corporation of New Jersey No Drawing. Application July 8, 1950, Serial No. 172,784

6 Claims. (Cl. 260—23)

This invention relates to the stabilization and plasticization of certain polyvinyl halide resin compositions, particularly those containing more than about 85% by weight of polyvinyl halide, with a plasticizing modifier comprising tricresyl phosphate, and a stabilizer comprising barium ricinoleate.

It is known that tricresyl phosphate may be used as a plasticizer for vinyl resins, and its use has been favored because of its exceptionally low volatility and its flame-proofing properties. However, vinyl resins, and particularly those containing more than about 85% by weight of vinyl halide, are seriously affected by sunlight and other light-aging and outdoor exposure when plasticized with tricresyl phosphate: the color turns dark and the flexibility is impaired. Prior attempts to overcome these disadvantages, the commercial effects of which may be readily appreciated, have resulted in suggestions that a calcium stearate or calcium ricinoleate stabilizer be added. As shown in the examples below, stabilization with calcium stearate or calcium ricinoleate is ineffective or only slightly effective; and after prolonged light-aging, the resin becomes embrittled and discolored.

Contrary to expectation, I have discovered that vinyl resins may be effectively stabilized by tricresyl phosphate when barium ricinoleate is incorporated as a stabilizer in the composition as described herein. Color variation and brittleness, after prolonged exposure to light, are not experienced or are only slight as compared with prior suggested solutions to the problem.

Vinyl halide resins which may be effectively plasticized and stabilized in accordance with this invention are copolymers of vinyl chloride and a vinyl ester or esters of an aliphatic acid, such as vinyl acetate, containing more than about 85% by weight of vinyl chloride, polyvinyl chloride resins and vinylidene chloride-vinyl chloride polymer resins containing more than 95% by weight of vinyl chloride.

In general, the maximum amount of barium ricinoleate which may be used without inducing cloudiness in the tricresyl-phosphate-plasticized film is about 3% by weight based on the weight of the resin; however when the resin film is pigmented, larger amounts of barium ricinoleate may be used, up to about 5 or 6%, or even higher, by weight of the resin, since the pigmentation masks the clouding effect. The minimum effective amount of barium ricinoleate stabilizer is about 0.5% by weight of the resin. In addition to imparting stabilizing properties to the resin, barium ricinoleate also acts as a lubricant in calendering and extruding operations, and, during milling, assists in preventing sticking of the resin compositions to the rolls of the mill.

In practicing the present invention, amounts of tricresyl phosphate may vary from about 11% to about 100% by weight based on the weight of the vinyl resin.

The examples below show the results obtained by the use of the present invention in vinyl halide resin compositions. Also shown are results of plasticizing vinyl halide resins with other plasticizers than tricresyl phosphate, both with and without the stabilizer used in this invention. The results are also shown of attempts to plasticize vinyl halide resins when using tricresyl phosphate as the plasticizer but using prior art stabilizers in the combination.

In each of the examples listed below, the ratio of resin to plasticizer to stabilizer was 70–30–2 parts by weight. Each of the films tested was originally flexible, colorless and transparent before exposure.

The test data show that barium ricinoleate is superior in its stabilizing action to both calcium stearate and calcium ricinoleate in a vinyl resin composition plasticized with tricresyl phosphate. The artificial light tests were made with a Weather-O-Meter, a product of Atlas Electrical Devices Co., consisting of two carbon arcs arranged to expose the test sample to ultraviolet light. This device also includes a liquid spray system, but the spray system was not used in the tests.

*Example 1.*—A film of copolymer of vinyl chloride and vinyl acetate (93–95% by weight of vinyl chloride) was plasticized with tricresyl phosphate (70 parts resin and 30 parts plasticizer by weight): designated below as Example A. The same compound with the same plasticizer, but stabilized with 2 parts by weight of barium ricinoleate is designated below as Example B. The results of light-aging, both artificial light and sunlight, are tabulated below.

100 hours' exposure to Weather-O-Meter:
    A. Muddy brown; rather stiff.
    B. Colorless; transparent; fairly flexible.
Outdoor exposure (Florida) for 100 sun hours:
    A. Dark brown; opaque; stiff.
    B. Very pale pink; transparent; fairly flexible.
Outdoor exposure (Florida) for 200 sun hours:
    A. Dark brown; opaque; quite stiff.
    B. Very pale pink; transparent; fairly flexible.

Outdoor exposure (Florida) for 300 sun hours:
 A. Dark brown; opaque; quite stiff.
 B. Brown specks; transparent; fairly flexible.

It is apparent that the incorporation of barium ricinoleate in the tricresyl phosphate-stabilized resin exhibited improved color and flexibility after long periods of rigorous exposure to light and weather.

*Example 2.*—The resin of Example 1 was plasticized with dioctyl phthalate: Compound C. The results were compared with the same resin plasticized as in Compound C, but to which two parts by weight of barium ricinoleate were added to determine any stabilizing effects on the composition of Compound C. The results, after various periods of aging, are as follows:

100 hours' exposure to Weather-O-Meter:
 C. Brown; transparent; flexible.
 D. Pale, reddish tan; transparent; flexible.
Outdoor exposure (Florida) 200 sun hours:
 C. Light brown; transparent; flexible.
 D. Tan; transparent; flexible.
Outdoor exposure (Florida) 300 sun hours:
 C. Reddish brown; translucent; fairly flexible.
 D. Reddish brown; translucent; brittle.

It is apparent that barium ricinoleate did not effectively improve the light resistant characteristics of the film when plasticized with dioctyl phthalate; and after 300 sun hours' exposure the film became brittle when barium ricinoleate was used, whereas it remained fairly flexible without barium ricinoleate. It is thus apparent that the stabilizing properties of barium ricinoleate, as shown by the tests, are specific to improvement of vinyl resin films plasticized with tricresyl phosphate. This conclusion is further supported by Example 3.

*Example 3.*—A film of the resin described in Example 1 was plasticized with propylene glycol sebacate; Compound E. Compound F, which was compared with Compound E, included 2 parts by weight of barium ricinoleate. The results show that barium ricinoleate does not act as a stabilizer for propylene glycol sebacate in vinyl halide resins after long exposure to sunlight.

Outdoor exposure (Florida) 200 sun hours:
 E. Dark brown; opaque; fairly flexible.
 F. Dark brown; opaque; fairly flexible.
Outdoor exposure (Florida) 300 sun hours:
 E. Black; opaque; rather stiff.
 F. Black; opaque; brittle.

*Example 4.*—A film of copolymer of vinyl chloride and vinyl acetate (88.5–90.5% by weight vinyl chloride) was plasticized with tricresyl phosphate: Compound G. The light-aging results were compared with Compound H, which was identical to Compound G except for the addition of 2 parts by weight of barium ricinoleate as a stabilizer. The following results of comparative tests show clearly that with this particular vinyl resin compound, as in Example 1 above, the stabilization, according to the present invention, is very effective.

100 hours' exposure to Weather-O-Meter:
 G. Jet black; opaque; stiff.
 H. Colorless; transparent; fairly flexible.
Outdoor exposure (Florida) 100 sun hours:
 G. Muddy purple; translucent; rather stiff.
 H. Colorless; transparent; fairly flexible.
Outdoor exposure (Florida) 200 sun hours:
 G. Jet black; opaque; rather stiff.
 H. Colorless; transparent; fairly flexible.
Outdoor exposure (Florida) 300 sun hours:
 G. Jet black; opaque; stiff.
 H. Very pale yellow; transparent; fairly flexible.

*Example 5.*—A film of vinyl chloride polymer resin was plasticized with tricresyl phosphate; Compound J. The light-aging results were compared with Compound K, which was identical to Compound J except for the addition of 2 parts by weight of barium ricinoleate as a stabilizer. The following results of comparative tests show clearly that with this particular vinyl resin compound, as in Example 1 above, the stabilization, according to the present invention, is very effective.

100 hours' exposure to Weather-O-Meter:
 J. Dark brown; opaque; rather stiff.
 K. Very pale pink; transparent; fairly flexible.
Outdoor exposure (Florida) 100 sun hours:
 J. Purple; translucent; fairly flexible.
 K. Very pale pink; transparent; fairly flexible.
Outdoor exposure (Florida) 200 sun hours:
 J. Dark brown; opaque; rather stiff.
 K. Light tan; transparent; fairly flexible.
Outdoor exposure (Florida) 300 sun hours:
 J. Dark brown; opaque; stiff.
 K. Light tan; translucent; fairly flexible.

*Example 6.*—A film of copolymer of vinylidene chloride-vinyl chloride copolymer (containing over 95% of vinyl chloride) was plasticized with tricresyl phosphate: Compound L. The light-aging results were compared with Compound M, which was identical to Compound L except for the addition of 2 parts by weight of barium ricinoleate as a stabilizer. The following results of comparative tests show clearly that with this particular vinyl resin compound, as in Example 1 above, the stabilization, according to the present invention, is very effective.

100 hours' exposure to Weather-O-Meter:
 L. Dark brown; translucent; rather stiff.
 M. Off-white; transparent; flexible.
Outdoor exposure (Florida) 100 sun hours:
 L. Light purple; transparent; fairly flexible.
 M. Very pale yellow; transparent; fairly flexible.
Outdoor exposure (Florida) 200 sun hours:
 L. Purplish brown; translucent; rather stiff.
 M. Very pale brown; transparent; fairly flexible.
Outdoor exposure (Florida) 300 sun hours:
 L. Dark red brown; opaque; rather stiff.
 M. Pale tan; transparent; fairly flexible.

*Example 7.*—A film of vinyl chloride polymer resin was plasticized with tricresyl phosphate: Compound N. The light-aging results were compared with Compound O, which was identical to Compound N except for the addition of 2 parts by weight of barium ricinoleate as a stabilizer; with Compound P, identical to Compound N except for the addition of 2 parts by weight of calcium ricinoleate as a stabilizer; with Compound Q, identical to Compound N except for the addition of 2 parts by weight of calcium stearate as a stabilizer. The following results of comparative tests show clearly that, with this particular vinyl resin compound, the effectiveness of the stabilizer of this invention, namely, barium ricinoleate, is greatly superior to the effectiveness of the prior art stabilizers, namely, calcium ricinoleate and calcium stearate.

110 hours' exposure to Weather-O-Meter:
    N. Badly discolored; transparent; flexible.
    O. Colorless; transparent; flexible.
    P. Discolored; transparent; flexible.
    Q. Discolored; transparent; flexible.

185 hours' exposure to Weather-O-Meter:
    N. Very bady discolored; transparent; brittle.
    O. Colorless; transparent; flexible.
    P. Badly discolored; transparent; brittle.
    Q. Very badly discolored; transparent; brittle.

300 hours' exposure to Weather-O-Meter:
    N. Very badly discolored; transparent; very brittle.
    O. Slightly discolored; transparent; fairly flexible.
    P. Very badly discolored; transparent; very brittle.
    Q. Very badly discolored; transparent; very brittle.

*Example 8.*—This is similar to Example 7, except that the resin used is that of Example 1. The unstabilized resin is designated as Compound R. The resin stabilized with 2 parts of barium ricinoleate is designated as Compound S; with 2 parts of calcium ricinoleate, as Compound T; with 2 parts of calcium stearate, as Compound U. Again, the outstanding superiority of barium ricinoleate over the prior art plasticizers is clearly shown.

110 hours' exposure to Weather-O-Meter:
    R. Badly discolored; transparent; flexible.
    S. Colorless; transparent; flexible.
    T. Discolored; transparent; flexible.
    U. Discolored; transparent; flexible.

185 hours' exposure to Weather-O-Meter:
    R. Very badly discolored; transparent; brittle.
    S. Colorless; transparent; flexible.
    T. Very badly discolored; transparent; brittle.
    U. Very badly discolored; transparent; brittle.

300 hours' exposure to Weather-O-Meter:
    R. Very badly discolored; transparent; very brittle.
    S. Slightly discolored; transparent; fairly flexible.
    T. Very badly discolored; transparent; brittle.
    U. Very badly discolored; transparent; brittle.

What is claimed is:

1. A composition of matter comprising a polyvinyl chloride resin containing more than about 85% by weight of polyvinyl chloride, tricresyl phosphate as a plasticizing component, and barium ricinoleate as a stabilizing component.

2. The composition of claim 1, in which said plasticizing component is present in an amount of from about 15 to about 55% by weight, based on the total composition.

3. The composition of claim 1, in which said stabilizing component is present in an amount of from about 0.5 to about 3.0% by weight, based on the total composition.

4. The composition of claim 1, in which said polyvinyl halide resin is polyvinyl chloride.

5. The composition of claim 1, in which said polyvinyl chloride resin is a copolymer of vinyl chloride and vinyl acetate, containing from about 88 to about 95% of vinyl chloride.

6. The composition of claim 1, in which said polyvinyl chloride resin is a copolymer of vinyl chloride and a minor amount of vinylidene chloride.

MALCOLM KENT SMITH.

REFERENCES CITED

The following references are of record in the file of this patent:

UNITED STATES PATENTS

| Number | Name | Date |
|---|---|---|
| Re. 22,812 | Jenkins | Dec. 3, 1946 |
| 2,075,543 | Reed et al. | Mar. 30, 1937 |
| 2,514,424 | Smith | July 11, 1950 |

OTHER REFERENCES

Modern Plastics, December 1949, pages 111 and 112.